United States Patent
Nakamura et al.

(10) Patent No.: US 6,301,859 B1
(45) Date of Patent: Oct. 16, 2001

(54) HEAT SEALER FOR SYNTHETIC RESIN BAG

(75) Inventors: Yoshihiro Nakamura; Hiroaki Morinaka, both of Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/298,672

(22) Filed: Apr. 23, 1999

(30) Foreign Application Priority Data

Apr. 27, 1998 (JP) .................................................. 10-117325

(51) Int. Cl.$^7$ .................................................... B65B 51/10
(52) U.S. Cl. ......................... 53/373.7; 53/375.9; 53/373.9
(58) Field of Search .................. 53/373.7, 375.9, 53/373.9, 550, 450, 551, 451, 463

(56) References Cited

U.S. PATENT DOCUMENTS

| | | |
|---|---|---|
| 4,359,361 * 11/1982 | Wright ................................. | 53/375.9 |
| 4,761,197   8/1988 | Christine et al. . | |
| 5,037,500   8/1991 | Hilpert . | |
| 5,277,745 * 1/1994 | Williams .............................. | 53/373.7 |
| 5,376,219 * 12/1994 | Sperry et al. ........................ | 53/373.7 |
| 5,403,427 * 4/1995 | Wilcox ................................. | 53/375.9 |
| 5,571,370 * 11/1996 | Selberg et al. ...................... | 53/375.9 |
| 5,649,407 * 7/1997 | Blomqvist .......................... | 53/373.7 |
| 5,682,732 * 11/1997 | Selberg ............................... | 53/375.9 |

FOREIGN PATENT DOCUMENTS 2690412    4/1992  (FR) .

* cited by examiner

Primary Examiner—Eugene Kim
(74) Attorney, Agent, or Firm—Hogan & Hartson, LLP

(57) ABSTRACT

A heat sealer capable of providing a high sealing strength by appropriating a distribution of temperature at two sheet contact faces (19a, 19b) includes a block (31) made of a metallic material having a high rigidity and operable to heat the resinous sheet (S) while pressing the latter. The block (31) is provided with heaters (24a, 24b) therein and also with heat conducting members (33a, 33b) each having an excellent heat conductive characteristic higher than that of the metallic material. The heat conducting members (33a, 33b) are positioned between the heaters (24a, 24b) and the sheet contact faces (19a, 19b), respectively.

12 Claims, 8 Drawing Sheets

HEAT SEALER FOR SYNTHETIC RESIN BAG

BACKGROUND OF THE INVENTION

1. Field of the Invention

The present invention generally relates to a heat sealer of a type capable of heat-sealing a sheet of a synthetic resin to form a bag and, more particularly, to horizontal and vertical sealing jaw assemblies for accomplishing horizontal and vertical seals, respectively.

2. Description of the Prior Art

The prior art weighing and packaging system will first be discussed with reference to FIG. 10 since the heat sealer to which the present invention pertains is generally employed in such weighing and packaging system. As shown in FIG. 10, the weighing and packaging system comprises a weighing apparatus 1 and a packaging machine 2 for successively packaging articles M, that are successively discharged from the weighing apparatus 1, with a sheet of a synthetic resin by forming such resinous sheet into bags one for each article M. Each article M may be one or a quantity of edible or non-edible items, for example, potato chips, fruits, candies, vegetables, screws, nails, bolts or other things desired or required to be bagged.

The weighing apparatus 1 is of a design operable to perform a combinational weighing by weighing the article M and then discharging the article M of a predetermined weight onto the packaging machine 2. This weighing apparatus 1 comprises a dispensing feeder 4 of a generally inverted conical shape for receiving articles M from a hopper 3 positioned thereabove and for dispensing the articles M towards an outer peripheral portion thereof, a plurality of vibratory feeders 5 disposed below the outer peripheral portion of the dispensing feeder 4 for receiving the respective articles M dispensed from the dispensing feeder 4 and subsequently transferring the articles M to a corresponding number of pool hoppers 6 positioned below the associated vibratory feeders 5, weighing hoppers 7 positioned below the corresponding pool hoppers 6 for receiving the respective articles M and operatively coupled with corresponding weighing cells 8 for measuring respective weights of the articles M within the weighing hoppers 7.

A control device 9 is of a design operable to select a combination of some or all of the weighing hoppers 7 which have measured the respective weight of the article M that falls within a predetermined weight tolerance, to cause respective gates of some or all of the weighing hoppers 7 so selected to open to allow the articles M to be discharged onto a collective discharge chute 10, and then to open a timing hopper 11, which is used to close a bottom opening of the collective discharge chute 10, so that the article M can be discharged onto the packaging machine 2 at a predetermined timing.

The packaging machine 2 comprises a bag former 12 positioned below the tiring hopper 11 of the weighing apparatus 1 for folding the synthetic sheet S inwardly along a longitudinal center line thereof so as to bring opposite longitudinal side portions of the strip of synthetic sheet to overlap with each other, a pair of juxtaposed endless pull-down belts 13 and 13 positioned below the bag former 12 for pulling the folded sheet S downwards, a vertical heat-sealing means (not shown) for heat-sealing opposite longitudinal side edges of the folded sheet S together to thereby shape the folded sheet S into a tubular form, and horizontal heat-sealing means 14 positioned below the vertical heat-sealing means for forming a transverse seal in the tubular sheet S to complete a bag.

The horizontal heat-sealing means 14 referred to above includes a pair of transverse sealing jaws 15 and 15 spaced a distance from each other and positioned on respective sides of the path of travel of the tubular sheet S. The transverse sealing jaws 15 and 15 are drivingly connected with respective drive means 16 and 16 so that the transverse sealing jaws 15 and 15 can be turned in respective senses opposite to each other so as to depict a generally D-shaped orbit as shown by the arrow in FIG. 10. More specifically, the drive means 16 and 16 are so drivingly synchronized with each other and also with the weighing apparatus 1 that starting from a top point PI at which the transverse sealing jaws 15 and 15 cooperate with each other to clamp the tubular sheet S, the transverse sealing jaws 15 and 15 can move downwards towards a bottom point P2 while pressing the tubular sheet S, then separate at the bottom point P2 away from each other and also from the tubular sheet S and finally swing backwards towards the top point P1. That portion of the tubular sheet S pressed by the transverse sealing jaws 15 and 15 is, during the downward movement of the transverse heat-sealing jaws 15 and 15 from the top point P1 to the bottom point P2, heat-sealed. Reference numeral 17 represents a control device for controlling the drive means 16 in operative association with the operation of the weighing apparatus 1. This type of the transverse heat-sealing means 14 is well known to those skilled in the art and is disclosed in, for example, the published International Application WO93/07058 and also in the Japanese Laid-open Patent Publication No. 62-235006.

Each of the transverse heat-sealing jaws 15 has such a cross-sectional shape as shown in FIG. 11A and includes a generally U-shaped support block 18 made of, for example, stainless steel and adapted to be carried by the associated drive means 16 (FIG. 10) forming a part of a press mechanism, and upper and lower presser pieces 20a and 20b made of, for example, stainless steel and having respective upper and lower sheet contact faces 19a and 19b. The support block 18 is of one-piece construction including upper and lower connecting arms 21 positioned on respective upper and lower sides of the U-shaped cavity in the support block 18, and the upper and lower presser pieces 20a and 20b are received within the U-shaped cavity in the support block 18 and are firmly connected to the respective upper and lower connecting arms 21 by means of set screws with the sheet contact faces 19a and 19b oriented in a direction away from the support block 18. The upper and lower presser pieces 20a and 20b rigidly connected to the support block 18 in the manner described above are spaced a distance from each other to define a cutter groove 22 in which a cutter blade 30 for severing the tubular sheet S is accommodated.

The support block 18 is formed with upper and lower cylindrical heater chambers 23a and 23b in which respective upper and lower rod heaters 24a and 24b are snugly fitted. Each of the presser pieces 20a and 20b has a respective heat pipe hole 25a or 25b formed therein at a location adjacent the corresponding sheet contact face 19a or 19b so as to extend a full width (as measured in a direction perpendicular to the sheet of the drawing of FIG. 11A or widthwise of the tubular sheet S) of the respective presser piece 20a or 20b, in which hole 25a or 25b is accommodated a corresponding heat pipe 26a or 26b. A temperature sensor 28 comprising a thermocouple encased in an enclosure is accommodated within a single sensor hole 27 formed in the support block 18 at a location between the lower heater hole 23b in the support block 18 and the heat pipe hole 25b in the lower presser piece 20b and beneath the imaginary line connecting therebetween. It is to be noted that in the following description, characters "a" and "b" affixed to reference numerals used to denote respective upper and lower portions of each component part may not be used.

FIG. 11B illustrates the pattern of distribution of temperature in one of the transverse heat-sealing jaws 15 measured at a portion thereof generally intermediate of the lengthwise direction thereof. It is to be noted that, in order for the illustrated transverse heat-sealing jaw 15 to be comparable with a counterpart (one of transverse heat-sealing jaws) embodying the present invention as will be described later, the transverse heat-sealing jaw 15 shown in FIG. 11B is assumed to have been formed of one-piece construction using the same material in the same cross-sectional shape as those of the counterpart of the present invention with the holes 23, 25 and 27 defined at the same respective positions as those in the counterpart of the present invention.

According to the pattern of temperature distribution shown in FIG. 11B, it is clear that a temperature difference of 17 to 18° C. is found between a portion of the transverse heat-sealing jaw 15 adjacent the sensor hole 27 and any of the sheet contact faces 19a and 19b and that depending on the condition under which heat is radiated a temperature difference is developed between the sheet contact faces 19a and 19b, with the temperature of the upper sheet contact face 19a being higher than that of the lower sheet contact face 19b, along with a varying distribution of a lower temperature range. Any of the upper and lower sheet contact face 19a and 19b is preferred to be heated to a uniform temperature of, for example, about 150° C. However, if the temperature to which any of the upper and lower sheet contact faces 19a and 19b is heated is lower than, for example, 140° C., the tubular sheet S will be sealed insufficiently to such an extent as that opposed portions of the tubular sheet S, which have been pressed by the transverse heat-sealing jaws 15 and 15, will be separated easily, but if such temperature is too high, the tubular sheet S will be fused or heat-shrunk locally accompanied by reduction in sealing strength.

Considering that the tubular sheet formed by heat-sealing the opposite longitudinal side edges of the folded sheet S by the action of the vertical heat-sealing means as hereinbefore discussed has a longitudinal sealed portion in the form of, for example, three- or four-fold hem that extends longitudinally of the tubular sheet S and that at the sealing station where the transverse heat-sealing jaws 15 and 15 form a transverse seal in the tubular sheet S the multi-fold hem, that is, the longitudinal sealed portion in the tubular sheet S is aligned with respective portions of the upper and lower sheet contact faces 19a and 19b substantially intermediate of the width thereof, each of the sheet contact faces 19a and 19b of the upper and lower presser pieces 20a and 20b then heated will exhibit such a pattern of temperature distribution that a substantial amount of heat is absorbed at that intermediate portion of the respective sheet contact face 19a or 19b by the tubular sheet S with the temperature thereof consequently lowered as compared with the remaining portion of the respective sheet contact face 19a or 19b. As a result, the resultant transverse seal in the tubular sheet S will exhibit a lower sealing strength at a portion thereof registered with and adjacent the longitudinal sealed portion of the tubular sheet C than at the remaining portion thereof.

In the prior art transverse heat-sealing jaws discussed hereinbefore, although the heat pipes 26a and 26b utilized to equalize the temperature distribution in the respective sheet contact faces 19a and 19b are effective to accomplish this objective as long as they are in operation over a substantial length of time, the prior art transverse heat-sealing jaws 15 and 15 have no capability of quickly compensating for reduction in temperature at those intermediate portions of the respective sheet contact faces 19a and 19b immediately following the transverse sealing action performed thereby. This lack of the capability of quickly compensating for reduction in temperature has long led to reduction in sealing strength in that portion of the transverse seal which is aligned with the longitudinal sealed portion in the tubular sheet S.

Also, since the temperature sensor 28 is positioned offset from the path of direct transmission of heat from the heaters to the adjacent sheet contact faces in the respective presser pieces, the actual temperature at the sheet contact faces considerably differs from the temperature measured by the temperature sensor, making it difficult to control the temperature of the sheet contact faces accurately and with high precision.

Furthermore, the prior art transverse heat-sealing jaws have another problem associated with the use of the single temperature sensor. Specifically, the use of the single temperature sensor in each of the transverse heat-sealing jaws is unable to detect the difference in temperature between the upper and lower sheet contact faces in each transverse heat-sealing jaw and, there is no way of eliminating the temperature difference between the sheet contact faces in each transverse heat-sealing jaw.

SUMMARY OF THE INVENTION

Accordingly, the present invention has been devised with a view to substantially eliminating the above discussed problems inherent in the prior art heat sealer and is intended to provide an improved heat sealer effective to accomplish a uniform and proper temperature distribution in the seat contact faces to secure a high sealing strength in the resultant seal.

In order to accomplish this object, the present invention in one aspect thereof provides a heat sealer including at least one heat-sealing jaw for pressing and heat-sealing a sheet of synthetic resin to form a bag. The heat-sealing jaw includes a block for heating the sheet while the sheet is pressed thereby, and made of a metallic material having a high rigidity. The block has a heater embedded therein and also has a sheet contact face. The block also includes a heat conducting member disposed therein at a location between the heater and the sheet contact face. The heat conducting member has an excellent heat conductive characteristic higher than that of the metallic material.

The metallic material preferably has a Young's modulus of elasticity descriptive of the rigidity thereof which is not smaller than $1.5 \times 10^{11}$ N/m$^2$ (corresponding to that of cast iron) and more preferably not smaller than $2.0 \times 10^{11}$ N/m$^2$ (corresponding to that of steel). Also, the heat conducting member preferably has a heat conductivity which is not lower than 100 W/(m·K) and more preferably not lower than 200 W/(m·K).

According to the heat sealer of the structure described above, since the heat conducting property from the heater to the sheet contact face can be increased by the heat conducting member, the amount of heat supplied to the sheet contact face can be increased. Accordingly, a sufficient amount of heat can be supplied to the multi-fold hem in the sheet where a relatively large amount of heat may be absorbed and, therefore, reduction in temperature at the multi-fold hem during the operation can be suppressed advantageously with improved temperature distribution at the sheet contact face. In this way, a high sealing strength can be obtained.

As a matter of course, if the heat conducting member has an insufficient heat conducting property, no sufficient amount of heat will be transmitted from the heater to the sheet contact face.

In a preferred embodiment of the present invention, the heat conducting member comprises a pipe having a hollow defined therein, and a temperature sensor is disposed within the hollow of the pipe. The use of the pipe together with the temperature sensor disposed within the hollow of the pipe is effective to increase the amount of heat supplied to the sheet contact face and, therefore, not only can the temperature distribution at the sheet contact face be enhanced, but also the temperature at respective intermediate portions of the upper and lower sheet contact faces can be measured with high precision.

In another preferred embodiment of the present invention, the block has a front portion of a cross-sectional shape which is tapered outwardly towards the sheet contact face when viewed in a direction perpendicular to a widthwise direction of the sheet contact face. According to this structure, the cross-section of the block smoothly changes from the heater towards the sheet contact face and, therefore, any possible turbulence of the heat stream directed from the heater towards the sheet contact face can advantageously be minimized to allow the temperature of the sheet contact face in a direction vertically thereof to become uniform.

In a further preferred embodiment of the present invention, the block has a front portion having a pair of parallel sheet contact faces defined therein, and includes a pair of heaters, mounted therein so as to confront with the respective sheet contact faces, and a pair of temperature sensors mounted therein for detecting respective temperature of the heaters. This design is effective to permit the sheet contact faces, separated vertically by the presence of, for example, a cutter groove, to be heated by the associated heaters and also to permit the respective temperatures of the sheet contact faces to be measured by the respective temperature sensor. Therefore, the respective temperatures of the sheet contact faces can be detected with high precision and can be properly controlled by adjusting the heat quantity of each of the heaters.

The present invention in another aspect thereof also provides a heat sealer including at least one heat-sealing jaw for pressing and heat-sealing a sheet of synthetic resin to form a bag. In this heat sealer, the heat-sealing jaw includes a block for heating the sheet while said sheet is pressed thereby, and has a front portion having a sheet contact face defined therein and also has a sensor hole defined therein for receiving a temperature sensor. A rod-shaped heater is mounted inside the block so as to extend parallel to the sheet contact face in a direction widthwise of the sheet contact face. The sensor hole extends parallel to the heater and is positioned between the heater and the sheet contact face when viewed in a cross-sectional plane lying perpendicular to the widthwise direction of the sheet contact face, with a whole or a most portion of the sensor hole located outside a generally triangular heat conductive region that is bound by imaginary lines passing in touch with opposite edges of the sheet contact face, which extend widthwise thereof, and converging at the heater.

According to this configuration, since there is little possibility that the path of conduction of heat from the heater to the sheet contact face will be disturbed by the presence of the sensor hole, the amount of heat supplied to the sheet contact face can be increased while a relatively high precision with which the temperature of the sheet contact face is detected is secured, resulting in favorable distribution of temperature at the sheet contact face.

According to a further aspect, the present invention provides a heat sealer including at least one heat-sealing jaw for pressing and heat-sealing a sheet of synthetic resin to form a bag. The heat-sealing jaw includes a block for heating the sheet while said sheet is pressed thereby, and a pressing mechanism for pressing the block against the sheet. The block is made of a metallic material having a high rigidity and comprises at least a support section adapted to be supported by the pressing mechanism, a pressing section having a sheet contact face defined therein, and a connecting section connecting between the support section and the pressing section. This block has a heater embedded therein and including a heat conducting member disposed therein at a location between the heater and the sheet contact face. The heat conducting member has an excellent heat conductive characteristic higher than that of the metallic material.

The metallic material preferably has a Young's modulus of elasticity descriptive of the rigidity thereof which is not smaller than $1.5 \times 10^{11}$ N/m$^2$ (corresponding to that of cast iron) and more preferably not smaller than $2.0 \times 10^{11}$ N/m$^2$ (corresponding to that of steel). Also, the heat conducting member preferably has a heat conductivity which is not lower than 100 W/(m·K) and more preferably not lower than 200 W/(m·K).

According to the above described structure, the heat conducting property between the heater and the sheet contact face can be increased and, therefore, the amount of heat supplied from the heater to the sheet contact face is increased with improved temperature distribution at the sheet contact face.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 11 B is a transverse sectional view of the prior art transverse heat-sealing jaw, showing a pattern of distribution of temperature occurring at the intermediate portion thereof.

DETAILED DESCRIPTION OF THE EMBODIMENTS

Figure 1A:
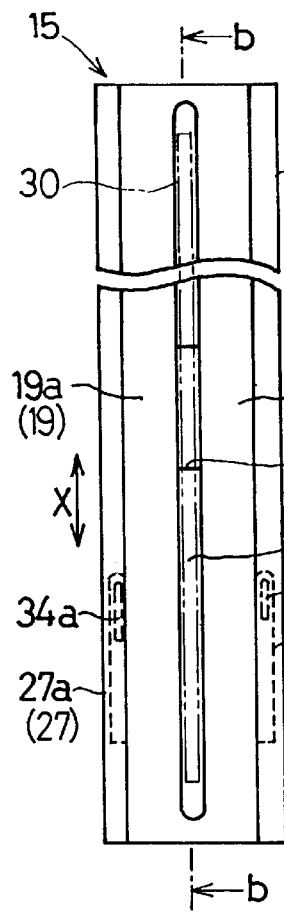
FIG. 1A is a front elevational view of one of transverse heat-sealing jaws employed in the heat sealer according to a first preferred embodiment of the present invention.
Figure 1B:
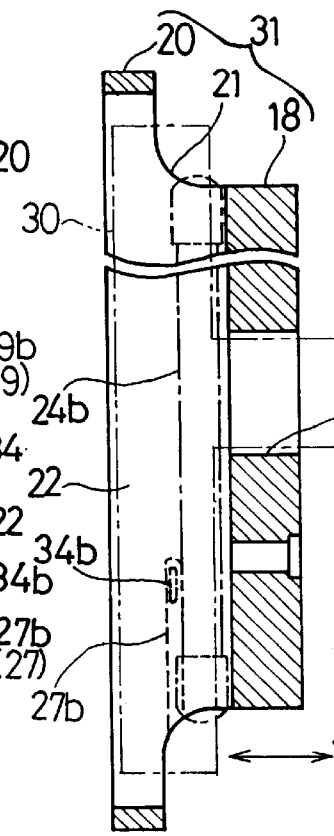
FIG. 1B is a longitudinal sectional view of the transverse heat-sealing jaw shown in FIG. 1A, taken along the line b—b in FIG. 1A.
Figure 1C:
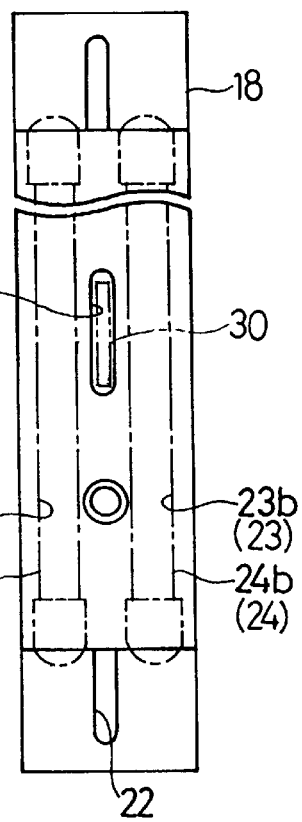
FIG. 1C is a rear elevational view of the transverse heat-sealing jaw shown in FIG. 1A.
Figure 1D:
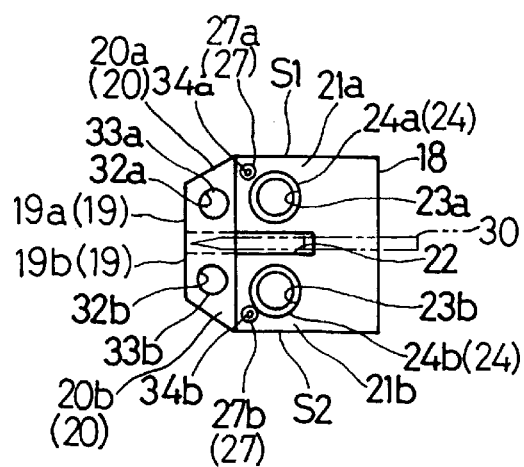
FIG. 1D is a side view of the transverse heat-sealing jaw shown in FIG. 1A.

In describing the various preferred embodiments of the present invention, reference will be made only to the single transverse heat-sealing jaw. Where the present invention is applied to the weighing and packaging system such as shown in and described with reference to FIG. 10, the transverse heat sealer makes use of two transverse heat-sealing jaws supported for movement in the manner described with reference to FIG. 10 as it is preferred in the practice of the present invention. However, depending upon the application, the heat sealer of the present invention may make use of a combination of a stationary sealing jaw with a movable sealing jaws supported for movement towards and away from the stationary sealing jaw or a combination of a backup plate with the single sealing jaw supported for movement towards and away from the backup plate.

First Preferred Embodiment—FIGS. 1A to 5

Referring first to FIGS. 1A to 1D, the transverse heat-sealing jaw 15 shown therein comprises a one-piece block 31 made of a metallic material having a high rigidity such as a ferrous material, for example, stainless steel and including a support section 18 adapted to be supported by the drive means 16 (FIG. 10) which forms a part of the pressing mechanism, a press section 20 having upper and lower sheet contact faces 19a and 19b defined therein, and a connecting section 21 connecting the press section 20 to the support section 18 with the upper and lower sheet contact faces 19a and 19b oriented in a direction away from the support section 18.

Figure 10:
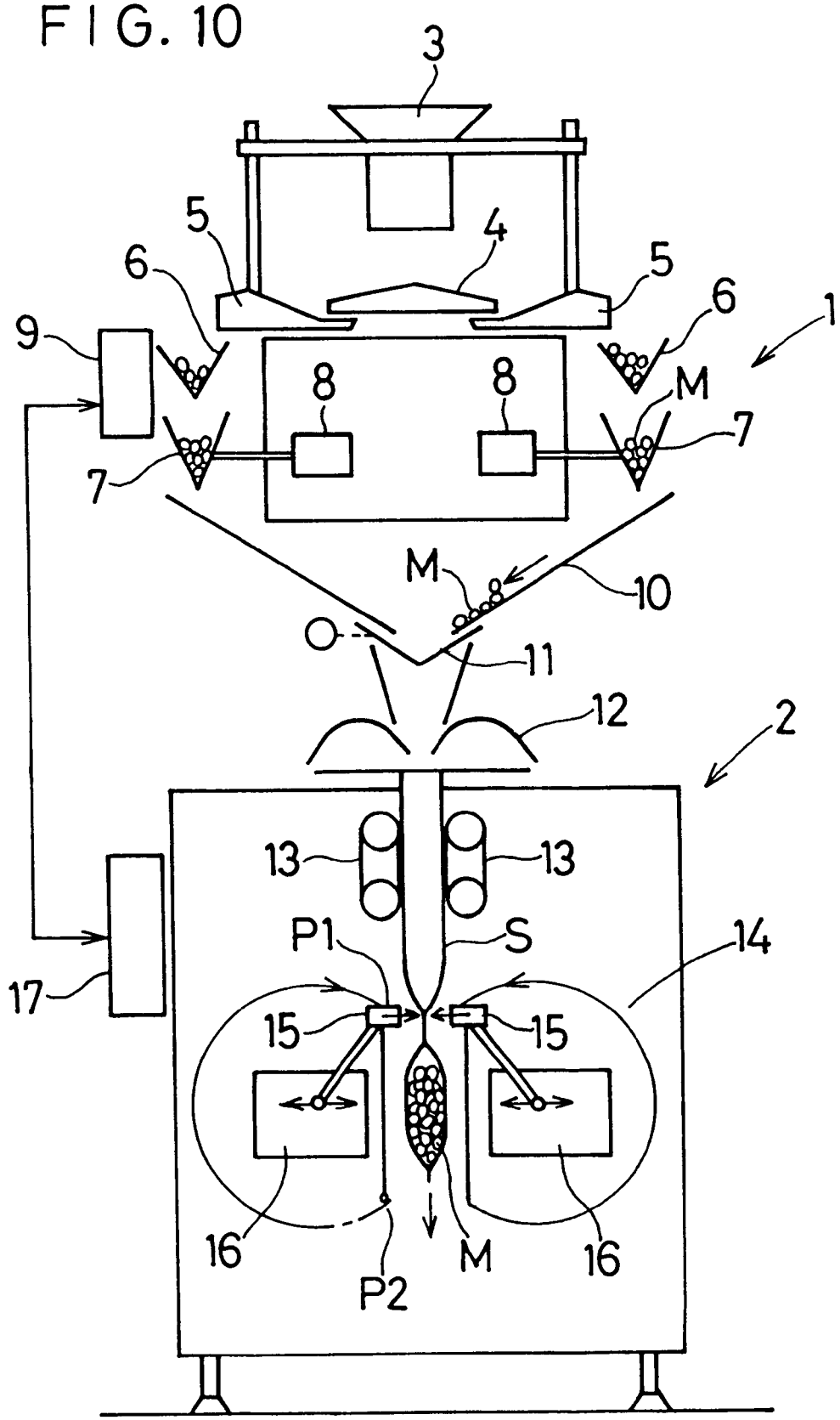
FIG. 10 is a schematic side view showing the combination weighing apparatus coupled with the packaging machine including the transverse heat-sealing jaws.
Figure 11A:
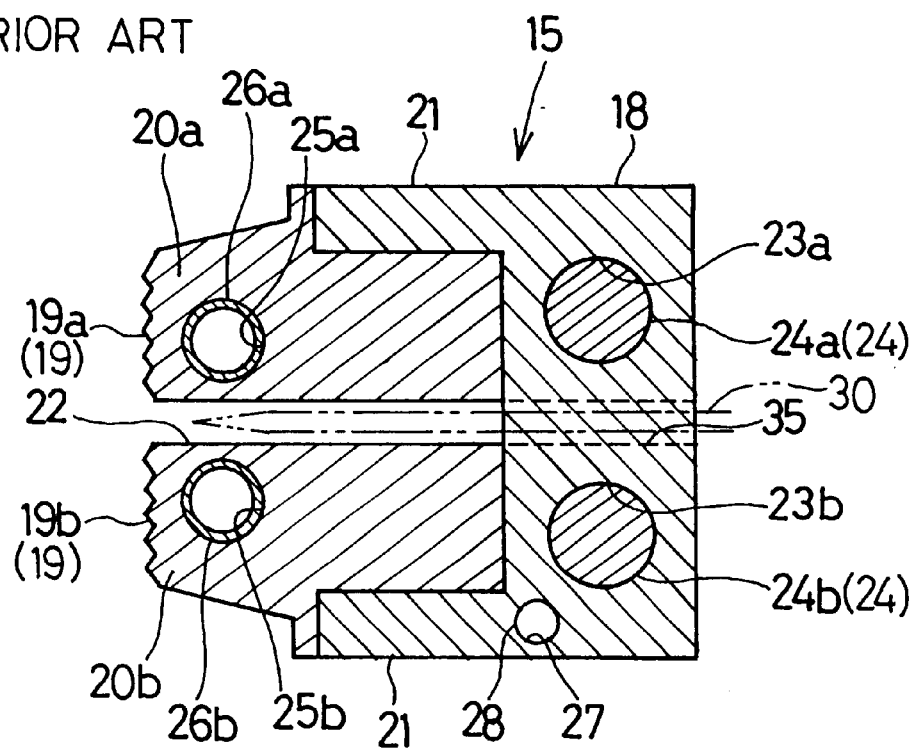
FIG. 11 A is a transverse sectional view of the prior art transverse heat-sealing jaw.
Figure 11B:
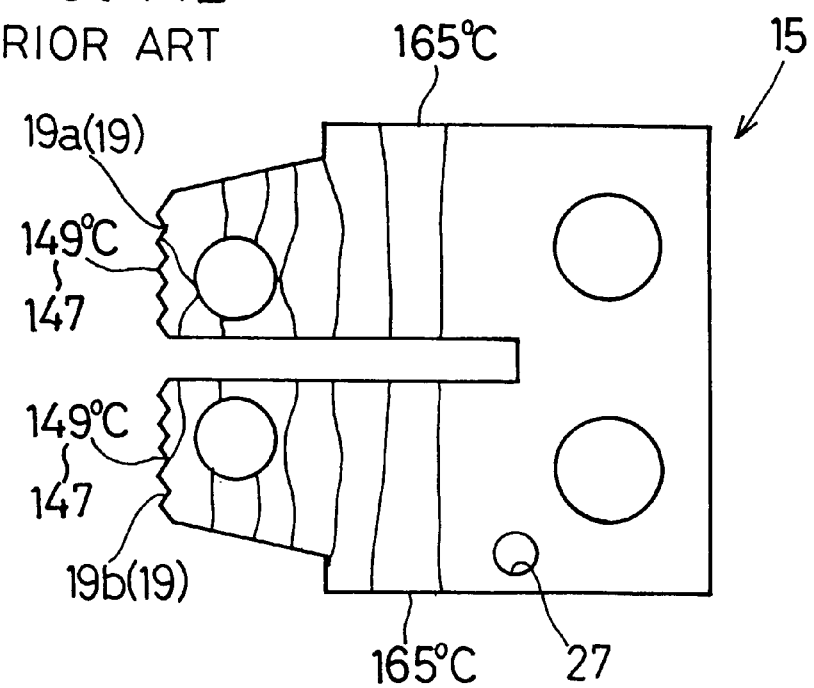

In this one-piece block 31, the press section 20 is formed with a cutter groove 22 traversing a fill width of the one-piece block 31 in a direction shown by the arrow while extending inwardly of the one-piece block 31 from a point substantially intermediate between the upper and lower sheet contact faces 19a and 19b to a position adjacent the support section 18. This cutter groove 22 is used to accommodate a cutter blade 30, which is selectively movable into and out of the cutter groove 22 in a direction shown by the arrow Y, when the cutter blade 30 moved thereout so as to sever the tubular sheet S (FIG. 10). The presence of the cutter groove 22 in the press section 20 separates the press section 20 into upper and lower presser pieces 20a and 20b and also the connecting section 21 into upper and lower connecting arms 21a and 21b. The press section 20 is tapered in a direction away from the support section 18 with upper and lower surfaces of the press section 20 and, hence, upper and lower surfaces of the respective upper and lower presser pieces 20a and 20b inclined downwardly and upwardly, respectively, so as to converge at a point away from the support section 18. The connecting arms 21a and 21b on respective sides of the cutter groove 22 are formed with respective cylindrical heater chambers 23a and 23b so as to extend lengthwise of the one-piece block 31 with associated rod heaters 24a and 24b snugly fitted therein.

An elongated upper or lower insertion hole 32a or 32b is formed in a portion of each of the presser pieces 20a or 20b between the corresponding sheet contact face 19a or 19b and the corresponding heater chamber 23a or 23b so as to extend a full width of the one-piece block 31. The insertion hole 32a and 32b so formed accommodates therein a respective heat conducting member 33a or 33b of a length substantially equal to the length of the associated insertion hole 32a or 32b. This heat conducting member 33a or 33b is in the form of a solid rod made of, for example, copper having a high thermal conductivity $\lambda$, that is, a high heat conductive characteristic. Also, a sensor hole 27a or 27b is formed in the one-piece block 31 at a respective location between the upper or lower heater chamber 23a or 23b and the upper or lower insertion hole 32a or 32b and adjacent an upper or lower surface S1 or S2 of the one-piece block 31, and a corresponding temperature sensor 34a or 34b of a type comprising a thermocouple encased in an enclosure is snugly inserted in the associated sensor hole 27a or 27b.

The support section 18 of the one-piece block 31 is also formed with a slide hole 35 communicated with the bottom of the cutter groove 22 and extending in a direction across the thickness of the support section 18 between the upper and lower surfaces S1 and S2 for slidably accommodating corresponding cutter support rods rigid with the cutter 30. Respective ends of the cutter support rods emerging outwardly from the support section 18 are in turn drivingly coupled with a cutter drive mechanism (not shown), forming a part of the associated drive means 16 (FIG. 10) so that the cutter 30 can protrude a slight distance outwardly from between the upper and lower sheet contact faces 19a and 19b to sever the tubular sheet S transversely and subsequently withdraw into the cutter groove 22.

Figure 2A:
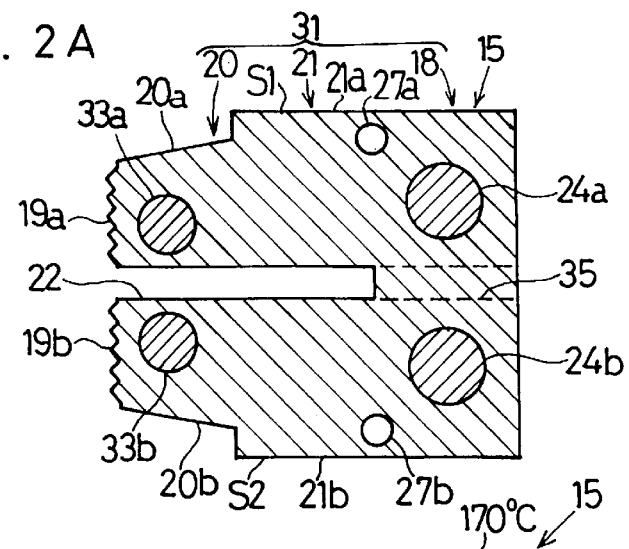
FIG. 2A is a transverse sectional view of a transverse heat-sealing jaw for use in measurement of a temperature distribution according to the first preferred embodiment of the present invention.

FIG. 2A illustrates a transverse section of the transverse heat-sealing jaw fabricated for use in measurement of a pattern of distribution of temperature in the heat-sealing jaw. The transverse heat-sealing jaw shown in FIG. 2A is substantially identical with the transverse heat-sealing jaw 15 shown in FIG. 1 as far as the respective positions of the component parts are concerned. However, respective distances between the heat conducting members 33a and 33b and the associated rod heaters 24a and 24b and other dimensional parameters employed in the transverse heat-sealing jaw of the present invention differ from those employed in the transverse heat-sealing jaw 15 shown in FIG. 1.

Figure 2B:
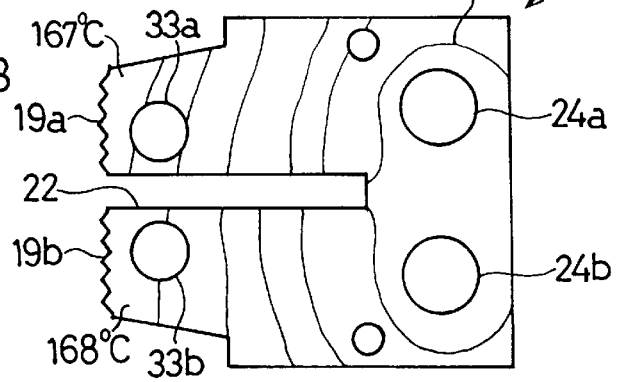
FIG. 2B is a view similar to FIG. 2A, showing a pattern of distribution of temperature in the transverse heat-sealing jaw when not in operation.
Figure 3:
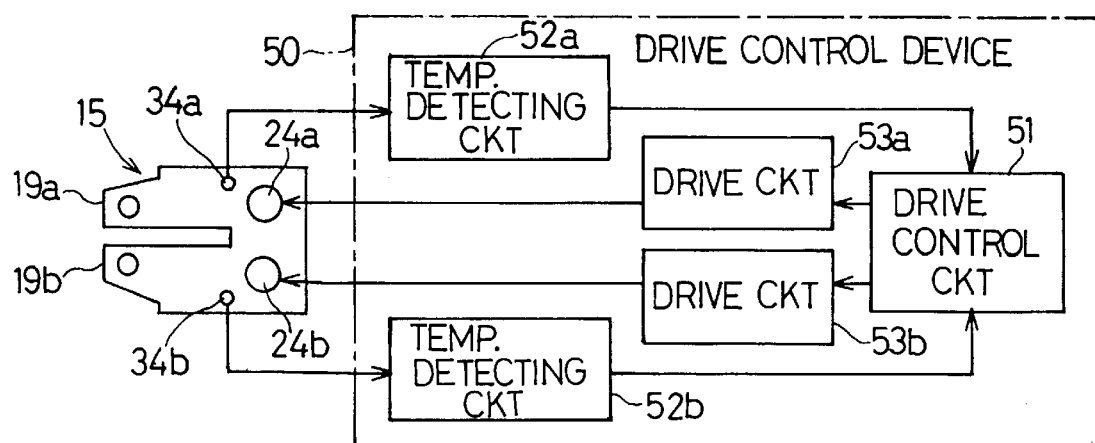
FIG. 3 is a schematic circuit block diagram showing a heating temperature control system employed in the first preferred embodiment of the present invention.

FIG. 2B illustrates the pattern of distribution of temperature at the sheet contact faces 19a and 19b and within the one-piece block 31 before the sealing action takes place, which distribution is exhibited when the paired rod heaters 24a and 24b are electrically energized by a drive control device, as will be described subsequently with reference to FIG. 3, so as to heat the sheet contact faces 19a and 19b to an equal temperature.

However, as can readily be understood from the temperature distribution pattern shown in FIG. 2B, the temperature of the upper sheet contact face 19a is slightly lower than that of the lower sheet contact face 19b. The reason therefor appears to have resulted from the fact that a loss of heat due to the convection of ambient air occurs more considerably in the upper sheet contact face 19a than in the lower sheet contact face 19b. Accordingly, the drive control device 50 shown in FIG. 3 comprises a drive control circuit 51 which in response to temperature signals indicative of the respective temperatures detected by the corresponding temperature sensors 34a and 34b and fed to the drive control device 50 through associated temperature detecting circuits 52a and 52b, controls first and second drive circuits 53a and 53b, connected respectively with the upper and lower rod heaters 24a and 24b, to cause the first and second drive circuits 53a and 53b to provide the upper and lower rod heaters 24a and 24b with first and second drive outputs, the first drive output being higher than the second drive output, wherefore the upper and lower sheet contact faces 19a and 19b can be heated to an equal temperature.

As described above, since the respective temperatures of the upper and lower rod heaters 24a and 24b are controlled based on the temperatures detected by the associated temperature sensors 34a and 34b and, therefore, the respective temperatures of the upper and lower sheet contact faces 19a and 19b can be properly controlled.

Figure 4:
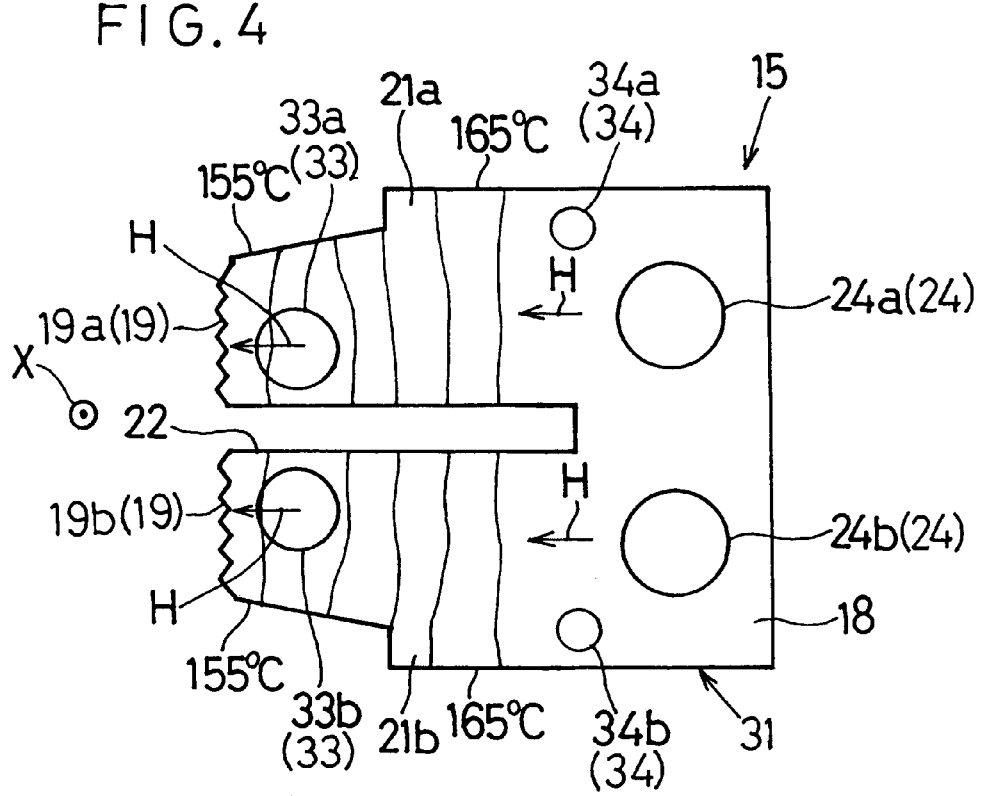
FIG. 4 is a transverse sectional view of the transverse heat-sealing jaw, showing the pattern of distribution of temperature in the transverse heat-sealing jaw when in operation.

FIG. 4 illustrates a pattern of distribution of temperature within the one-piece block 31 measured when the transverse heat-sealing jaw 15 is in heat-sealing action. According to the first preferred embodiment of the present invention, both of the upper and lower sheet contact faces 19a and 19b were kept at an equal temperature of, for example, about 155° C. over the entire surface thereof and there was no possibility that the temperature at that portion of each sheet contact face 19a and 19b intermediate of the width thereof as measured in the direction shown by X in FIG. 1A might be lower than that at the remaining portion of the respective sheet contact face 19a and 19b. That is because in place of the heat pipes employed in the prior art transverse heat-sealing jaw, the use of the heat conducting members 33a and 33b of a high heat conductivity disposed adjacent the respective sheet contact faces 19a and 19b has improved the heat conductive characteristic and because a sufficient amount of heat could have therefore been provided to the upper and lower sheet contact faces 19a and 19b to such an extent that reduction of the temperature at the intermediate portion of each of the upper and lower sheet contact faces 19a and 19b where a relatively large amount of heat is absorbed due to the presence of the multi-fold hem in the tubular sheet can be suppressed as minimum as possible.

In other words, the heat pipes employed in the prior art transverse heat-sealing jaw are of a design wherein a wick is fitted to an inner peripheral surface of each heat pipes having its opposite ends closed and a working liquid is filled therein. This design utilizes the phase change of the working liquid which is vaporized when heated, but returns to a liquid phase when cooled in contact with a portion of the respective heat pipe where the temperature is low, so that heat can be quickly and efficiently transmitted in the lengthwise direction of the respective heat pipe. However, as a result of a series of experiments conducted by the inventors of the present invention, it has been found that the heat pipe has not sufficient heat conductive characteristic in a radial direction, and that the use of the heat conducting members having a high heat conductivity $\lambda$ such as employed in the practice of the present invention has exhibited an excellent heat conductive characteristic in a radial direction and, also, a sufficient heat conductive characteristic in a lengthwise direction although somewhat lower than that exhibited by the heat pipes. Accordingly, a majority of the heat stream H from the upper and lower rod heaters 24a and 24b can be transmitted to the upper and lower sheet contact faces 19a and 19b passing through the heat conducting members 33a and 33b in the radial direction, thereby suppressing any possible reduction in temperature of the upper and lower sheet contact faces 19a and 19b, particularly, those intermediate portions thereof, during the heat-sealing action.

Figure 5:
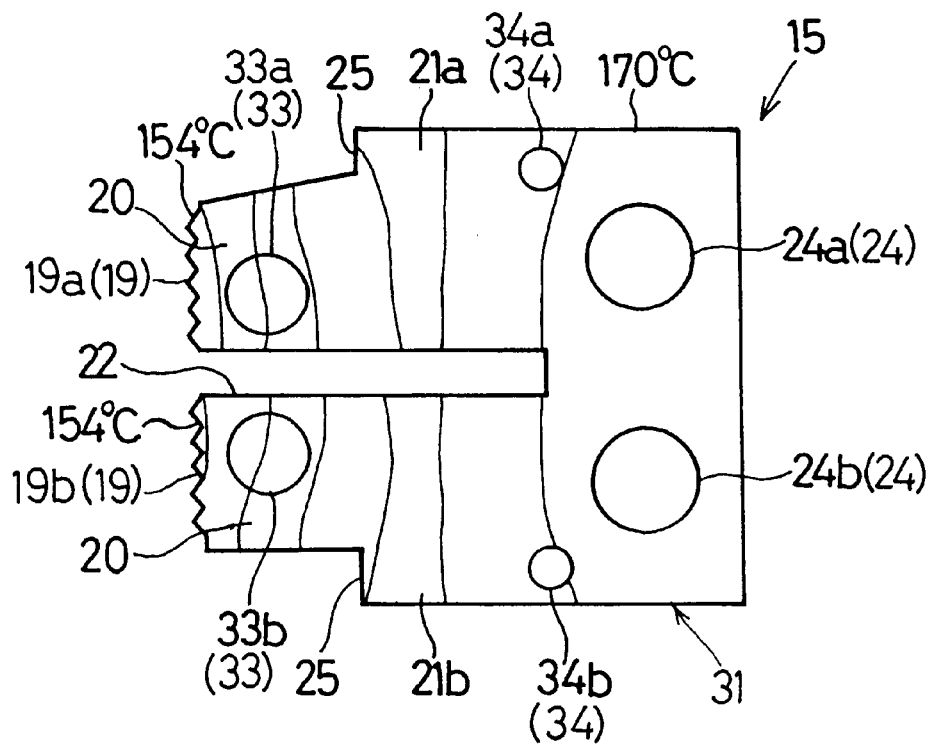
FIG. 5 is a view similar to FIG. 4, showing the pattern of distribution of temperature in the transverse heat-sealing jaw when in operation, in the case where the transverse heat-sealing jaw according to the first preferred embodiment of the present invention has a generally tapered presser piece and a generally straight presser piece.

FIG. 5 illustrates the one-piece block 31 employed during the experiment conducted to determine what difference would be brought about depending on the cross-sectional shape of the one-piece block 31. For this purpose, the one-piece block 31 was so shaped as to have the connecting arms 21a and 21b of different shape, in which the connecting arm 21a has an upper surface tapered towards the adjacent sheet contact face 19a, i.e., inclined downwardly relative to the plane in which the cutter groove 22 lies, whereas the connecting arm 21b has a uniform thickness with its lower surface extending straight towards the lower sheet contact face 19b and parallel to the plane in which the cutter groove 22 lies. The shape of the connecting arm 21a shown in FIG. 5 is in accordance with the embodiment of the present invention while the shape of the connecting arm 21b shown in FIG. 5 is similar to that employed in the prior art transverse heat-sealing jaw.

FIG. 5 makes it clear that the upper sheet contact face 19a defined in the tapering connecting arm 21a has shown a relatively small variation in temperature since a change in dimension in a direction perpendicular to the direction of travel of the heat stream H from the upper rod heater 24a towards the upper sheet contact face 19a, that is, a change in cross-sectional area is smooth. In contrast thereto, the lower sheet contact face 19b defined in the straight connecting arm 21b has shown a substantial variation in temperature since a step 25 defined between the connecting arm 21b and the press section 20 has so substantial a height that a change in dimension in the direction orthogonal to the heat stream H is considerable at the step 25 enough to cause a turbulence in the heat stream H. Thus, it will readily be seen that if the press section 20 is so shaped as to taper in a direction towards the sheet contact surfaces 19a and 19b, uniform temperature distribution can be attained at the sheet contact faces 19a and 19b.

It is to be noted that if press section 20 is so shaped as to taper in a direction towards the sheet contact surfaces 19a and 19b, an additional advantage can be appreciated that the press section 20 can have an increased thickness at the tapered portion and, therefore, the mechanical strength of the press section 20 can be increased when the sheet contact faces 19a and 19b are brought into contact with the tubular sheet S to form seals therein.

Figure 6A:
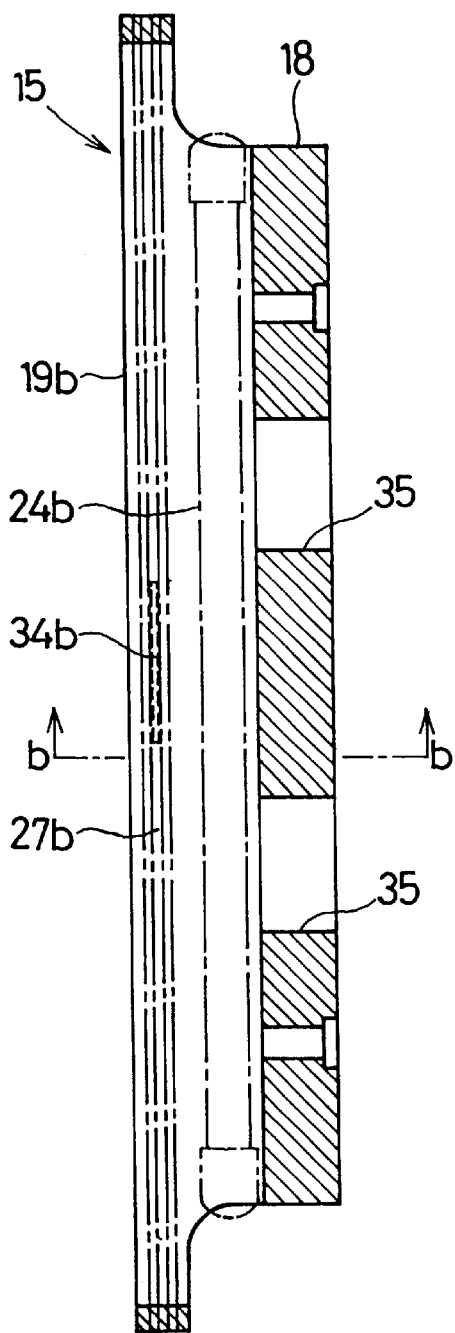
FIG. 6A is a longitudinal sectional view of the transverse heat-sealing jaw according to a second preferred embodiment of the present invention.
Figure 6B:
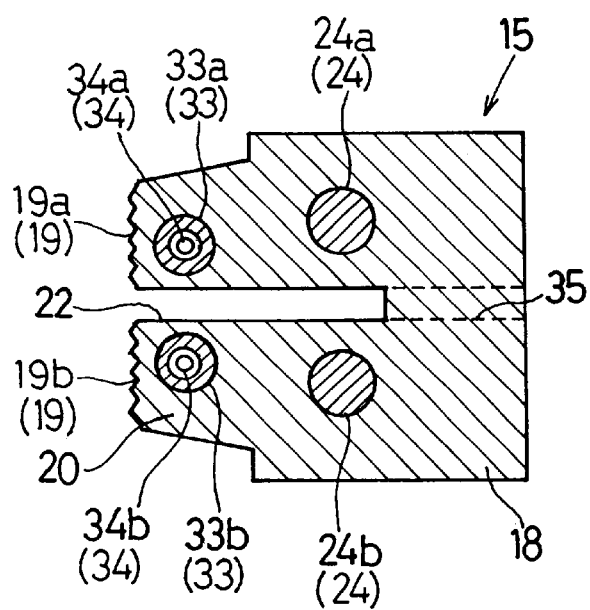
FIG. 6B is a transverse sectional view of the transverse heat-sealing jaw shown in FIG. 6A, taken along the line b—b in FIG. 6A.

Second Preferred Embodiment—FIGS. 6A and 6B

The transverse heat-sealing jaw 15 according to the second preferred embodiment of the present invention differs from that according to the first preferred embodiment in that each of the upper and lower heat conducting members 33a and 33b is employed in the form of a metallic pipe of a high heat conducting property made of, for example, copper and having a relatively large wall thickness and that the corresponding temperature sensors 34a and 34b are inserted into the heat conducting members 33a and 33b to occupy a position aligned with the intermediate portion of the associated sheet contact faces 19a and 10b.

According to the second preferred embodiment, since the temperature sensors 34a and 34b can directly measure the respective temperatures at the intermediate portions of the upper and lower sheet contact faces 19a and 19b, the accuracy of measurements at the intermediate portions can be increased considerably and, therefore, the control of the respective temperatures at the intermediate portions of the upper and lower sheet contact faces 19a and 19b which seal the multi-fold hem in the tubular sheet S can be achieved with high precision.

Also, since the metallic pipes 33a and 33b are excellent in radial heat conducting properties as compared with the heat pipes employed in the prior art transverse heat-sealing jaw, a majority of the heat stream H from the heaters 24a and 24b can be effectively transmitted to the upper and lower sheet contact faces 19a and 19b through the pipes 33a and 33b. Consequently, any possible reduction of the temperature at the portion of each of the upper and lower sheet contact faces 19a and 19b intermediate of the width thereof as measured in the direction X during the heat-sealing action can advantageously be suppressed.

It is to be noted that while in the second preferred embodiment shown the two temperature sensors 34a and 34b are employed one for each of the upper and lower metallic pipes 33a and 33b, only one temperature sensor 34 may be employed, in which case it may be accommodated within either of the metallic pipes 33a and 33b. Also, it is possible for the temperature sensor 34 to be accommodated within one end of one of the metallic pipes 33a and 33b employed in the second preferred embodiment or within a sensor hole 27 formed at one end of one of the heat conducting members 33a and 33b employed in the first preferred embodiment.

Figure 7A:
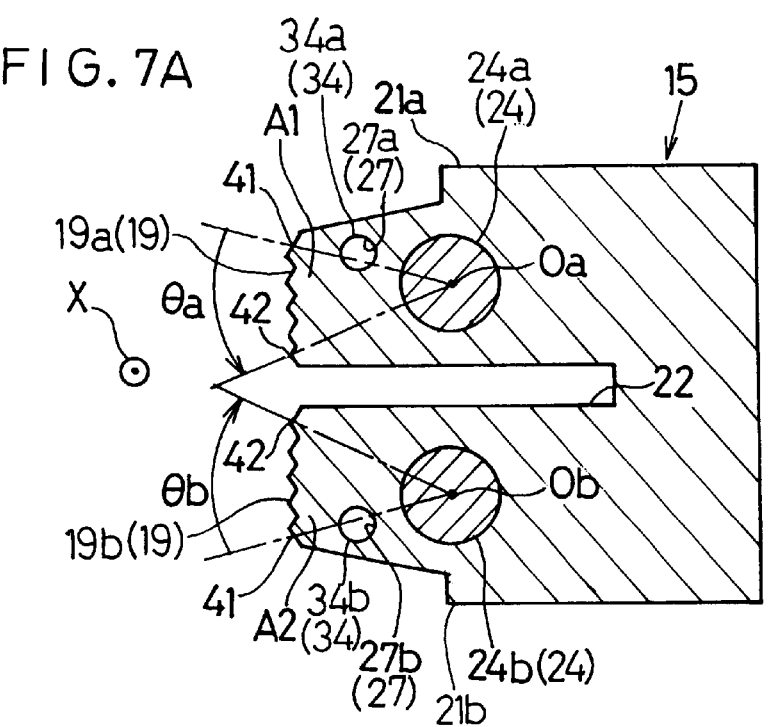
FIG. 7A is a transverse sectional view of the transverse heat-sealing jaw according to a third preferred embodiment of the present invention.
Figure 7B:
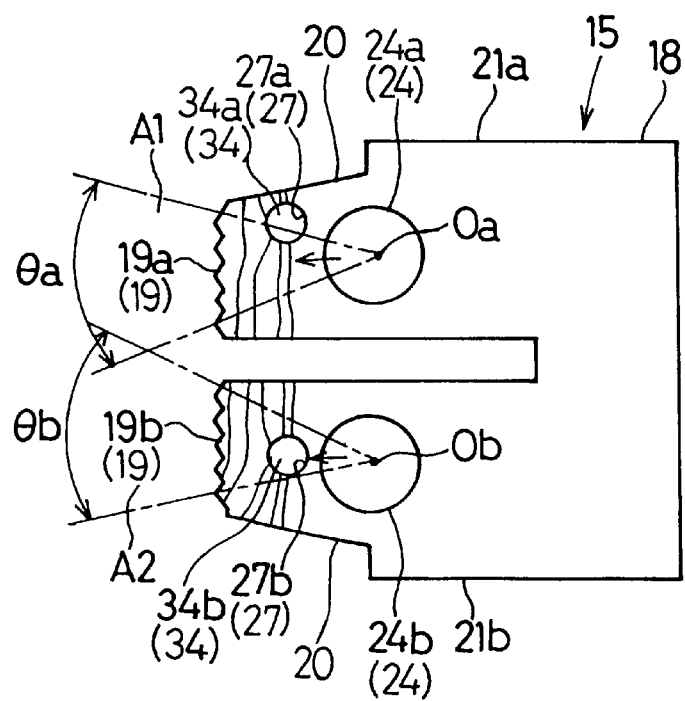
FIG. 7B is a transverse sectional view of the transverse heat-sealing jaw of FIG. 7A, showing the pattern of distribution of temperature in such transverse heat-sealing jaw shown together with a comparative example.

Third Preferred Embodiment—FIGS. 7A and 7B

In this third preferred embodiment shown specifically in FIG. 7A, the upper and lower rod heaters 24a and 24b are arranged in the upper and lower connecting arms 21a and 21b, respectively, and, at the same time, the upper and lower sensor holes 27a and 27b are defined in the upper and lower connecting arms 21a and 21b at respective locations between the upper and lower rod heaters 24a and 24b and the upper and lower sheet contact faces 19a and 19b with most of each of the upper and lower sensor holes 27a and 27b positioned outside a generally triangular heat conductive region A1 and A2. The triangular heat conductive region A1 in the upper connecting arm 21a is defined as bound between two imaginary lines passing in touch with upper and lower edges 41 and 42 (extending in the direction X) of the upper contact face 19a, respectively, and converging at an angle θa at the longitudinal center Oa of the upper rod heater 24a, whereas the triangular heat conductive region A2 in the lower connecting arm 21b is similarly defined as bound between two imaginary lines passing in touch with lower and upper edges 41 and 42 of the lower contact face 19b, respectively, and converging at an angle θb at the longitudinal center Ob of the lower rod heater 24b.

FIG. 7B illustrates the transverse heat-sealing jaw for experimental use, in which the upper half of the one-piece block 31 is constructed in accordance with the third preferred embodiment of the present invention and the lower half thereof is so constructed as to have the lower sensor hole 27b positioned inside the triangular heat conductive region A2 bound between the two imaginary lines passing in touch with the upper and lower edges 42 and 41 of the lower sheet contact face 19b and converging at the longitudinal center Ob of the lower rod heater 24b.

A series of experiments conducted by the inventors of the present invention using the structure shown in FIG. 7B have shown that a uniform distribution of temperature was obtained at the upper sheet contact face 19a while the distribution of temperature at the lower sheet contact face 19b was impaired. In view of this, it has been confirmed that the third embodiment of the present invention in which only respective small portions of the sensor holes 27a and 27b are positioned inside the triangular heat conductive regions A1 and A2 with the remaining most portions thereof positioned outside the triangular heat conductive regions A1 and A2 is effective to achieve a uniform temperature distribution at the sheet contact faces 19a and 19b since the extent to which conduction of heat from the heaters 24a and 24b to the associated sheet contact faces 19a and 19b is disturbed by the sensor holes 27a and 27b is smaller in the third embodiment of the present invention than the case in which the sensor holes 27a and 27b are in their entirety positioned inside the respective triangular heat conductive regions A1 and A2. Nevertheless, for the purpose of the present invention, the upper and lower sensor holes 27a and 27b may be in their entirety positioned outside the respective heat conductive regions A1 and A2.

It is to be noted that if the heat conducting members 33a and 33b such as, for example, pipes are mounted inside the respective sensor holes 27a and 27b and the corresponding temperature sensors 34a and 34b are then inserted in the heat conducting members 33a and 33b within the sensor holes 27a and 27b, effects similar to those afforded by the previously discussed second preferred embodiment of the present invention can be obtained and, therefore, any possible variation in temperature at the upper and lower sheet contact faces 19a and 19b can be effectively minimized even though each of the upper and lower presser pieces 20a and 20b is constructed in a manner similar to the lower presser piece 20b shown in FIG. 7B.

Figure 8:
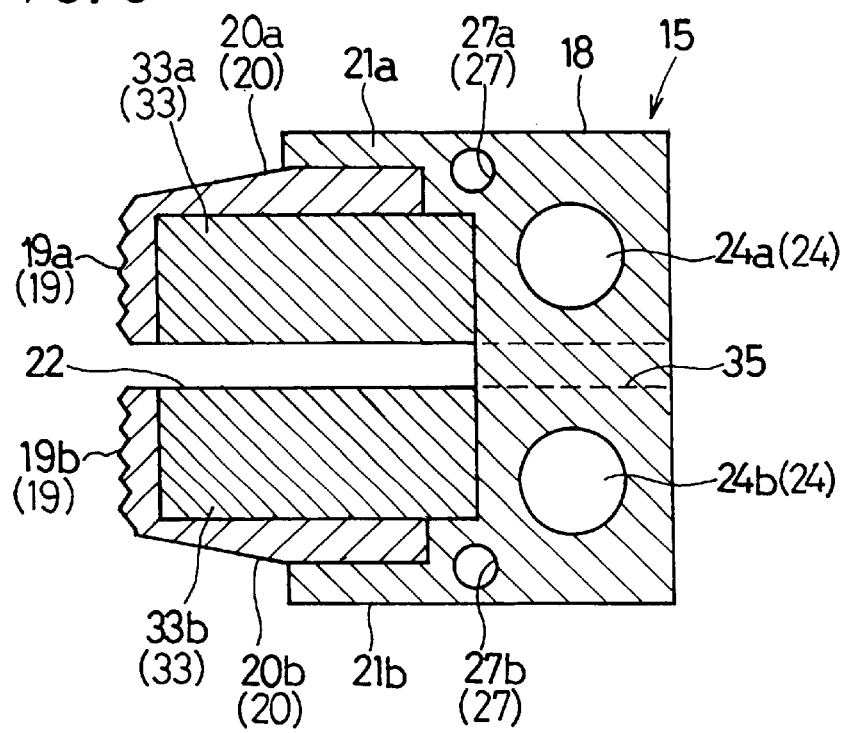
FIG. 8 is a transverse sectional view of the transverse heat-sealing jaw of a separate type according to a fourth preferred embodiment of the present invention.

Fourth Preferred Embodiment—FIG. 8

The fourth preferred embodiment of the present invention shown in FIG. 8 pertains to the transverse heat-sealing jaw 15 of a separate type in which the support section 18, the connecting arms 21a and 21b and the press section 20 continued therefrom are made of a metallic material having a high rigidity such as, for example, a ferrous material and are imparted a strength sufficient to withstand a pressing force and also in which two heat conducting members 33a and 33b each made of a square block member or rectangular parallelopiped member having a high heat conductive characteristic are positioned between the rod heaters 24a and 24b and the associated sheet contact faces 19a and 19b. The heat conducting members 33a and 33b may be made of a metal, for example, copper or may be made of the same material as that used for the heat pipes.

According to the fourth embodiment of the present invention, because of the provision of the heat conducting members 33a and 33b, heat conduction from the rod heaters 24a and 24b towards the associated sheet contact faces 19a and 19b can be increased to secure an improved temperature distribution at the sheet contact faces 19a and 19b.

It is to be noted that if the sensor holes 27a and 27b are defined inside the respective heat conducting members 33a and 33b, the sensor positions approach the respective sheet contact faces 19a and 19b, and accordingly, the accuracy of temperature measurement can be increased.

Figure 9:
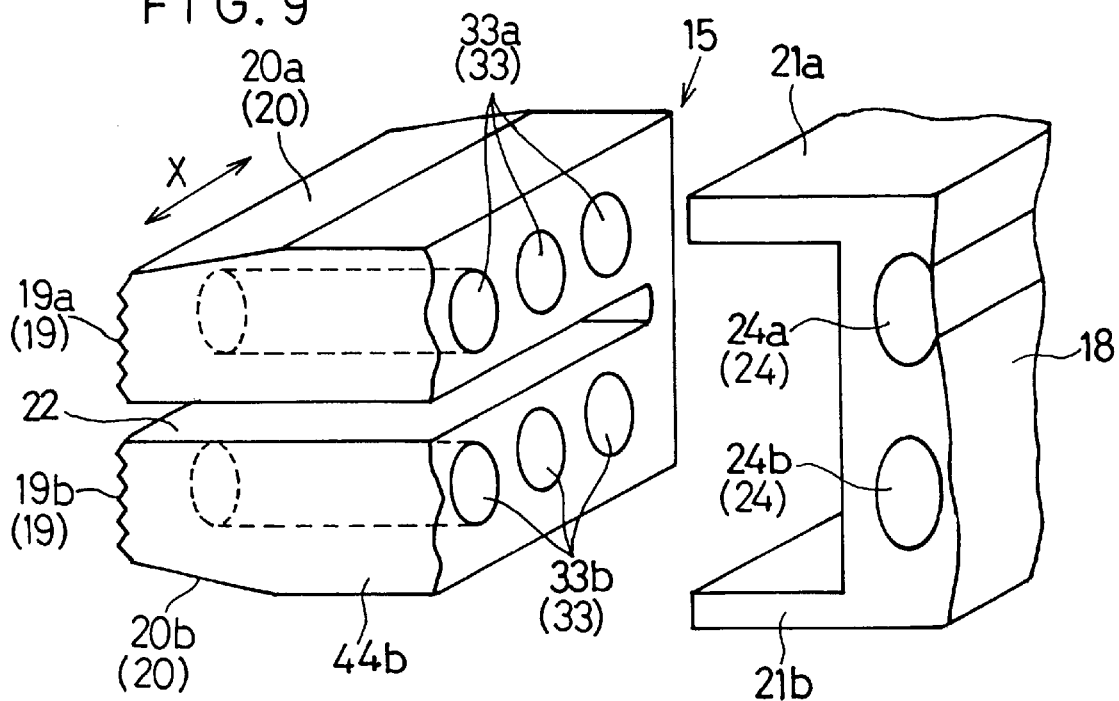
FIG. 9 is an exploded perspective view showing the transverse heat-sealing jaw of the separate type according to a fifth preferred embodiment of the present invention.

Fifth Preferred Embodiment—FIG. 9

The fifth preferred embodiment of the present invention also pertains to the transverse heat-sealing jaw of the separate type which is shown in an exploded perspective view in FIG. 9. As shown therein, pluralities of heat conducting members 33a and 33b each being of a cylindrical shape or a columnar shape are embedded in a fashion juxtaposed in the direction X in the upper and lower presser pieces 20a and 20b of the press section 20 so as to extend perpendicular to the direction X or to the respective planes of the upper and lower sheet contact faces 19a and 19b and so as to extend between the upper and lower rod heaters 24a and 24b and the upper and lower sheet contact faces 19a and 19b. Even this fifth embodiment of the present invention can bring about effects similar to those afforded by the previously discussed fourth embodiment of the present invention.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, in the practice of the present invention, although the present invention is preferably to both of the transverse heat-sealing jaws as shown in FIG. 10, it may be applied only to one of the transverse heat-sealing jaws.

Accordingly, such changes and modifications are, unless they depart from the scope of the present invention as delivered from the claims annexed hereto, to be construed as included therein.

What is claimed is:

1. A heat sealer for pressing and heat-sealing a sheet of synthetic resin to form a bag, comprising:
   a heat-sealing jaw with a contact face for pressing the sheet;
   a block continuous with said jaw for heating the sheet while said sheet is pressed thereby, said block being made of a metallic material having a high rigidity;
   an elongate heater embedded within the block with a long axis of the heater parallel to a long axis of the contact face;
   a metallic heat conducting member disposed within the block with a long axis of the heat conducting member parallel to a long axis of the contact face at a location between the heater and the sheet contact face, said metallic heat conducting member having a heat conductivity greater than that of the metallic material in a direction from the heater to the contact face.

2. The heat sealer as claimed in claim 1, wherein said metallic heat conducting member comprises a thick-walled pipe having a hollow defined therein, and further comprising a temperature sensor disposed within the hollow of the pipe.

3. The heat sealer as claimed in claim 2, wherein said temperature sensor within the hollow of the pipe is positioned at a location substantially intermediate of a length of the pipe.

4. The heat sealer as claimed in claim 1, wherein said heat conducting member comprises a solid rod member.

5. The heat sealer as claimed in claim 1, wherein said block has a front portion of a cross-sectional shape which is tapered outwardly towards the sheet contact face when viewed in a direction perpendicular to a widthwise direction of the sheet contact face.

6. The heat sealer as claimed in claim 1, wherein said block has a front portion having a pair of parallel sheet contact faces defined therein; and
   wherein the block includes a pair of heaters, mounted therein so as to confront with the respective sheet contact faces, and a pair of temperature sensors mounted therein for detecting respective temperature of the heaters.

7. The heat sealer as claimed in claim 1, wherein said metallic material has a Young's modulus of elasticity which is not smaller than $1.5 \times 10^{11}$ N/m$^2$.

8. A heat sealer for pressing and heat-sealing a sheet of synthetic resin to form a bag, comprising:
   a heat-sealing jaw with a contact face for pressing the sheet;
   a block continuous with said jaw for heating the sheet while said sheet is pressed thereby, the sheet contact face defined in a front portion of said block with a sensor hole defined therein for receiving a temperature sensor; and
   a rod-shaped heater mounted inside the block so as to extend parallel to the sheet contact face in a widthwise direction, said sensor hole extending parallel to the heater,
      wherein said sensor hole is positioned between the heater and the sheet contact face when viewed in a cross-sectional plane lying perpendicular to the widthwise direction of the sheet contact face, with all or most of the sensor hole located outside a generally triangular heat conduction region bound by imaginary lines passing from opposite widthwise edges of the sheet contact face and converging at the heater.

9. A heat sealer for pressing and heat-sealing a sheet of synthetic resin to form a bag, comprising:
   a heat-sealing jaw with a contact face for pressing the sheet;
   a block continuous with said jaw for heating the sheet while said sheet is pressed thereby, said block being made of a metallic material having a high rigidity;
   a pressing mechanism for pressing the block against the sheet, said block further comprising at least a support section adapted to be supported by the pressing mechanism;
   a pressing section having a sheet contact face defined therein, and a connecting section connecting between the support section and the pressing section;
   an elongate heater embedded within the block with a long axis of the heater parallel to a long axis of the contact face; and
   a metallic heat conducting member disposed within the block with a long axis of the heat conducting member parallel to a long axis of the contact face at a location between the heater and the sheet contact face, said metallic heat conducting member having a heat conductivity greater than that of the metallic material in a direction from the heater to the contact face.

10. The heat sealer as claimed in claim 9, wherein said metallic material has a Young's modulus of elasticity which is not smaller than $1.5 \times 10^{11}$ N/m².

11. The heat sealer as claimed in claim 9, wherein the heat conducting member has a heat conductivity which is not smaller than 100 W/(m·K).

12. The heat sealer as claimed in claim 7, wherein the heat conducting member has a heat conductivity which is not smaller than 100 W/(m·K).

\* \* \* \* \*